(12) United States Patent
Murakami et al.

(10) Patent No.: US 9,004,996 B2
(45) Date of Patent: Apr. 14, 2015

(54) PROGRAM, SERVER, AND METHOD FOR PINBALL GAME

(71) Applicant: DeNA Co., Ltd., Tokyo (JP)

(72) Inventors: Koichi Murakami, Tokyo (JP); Ayumi Takano, Tokyo (JP); Yoshiki Watabe, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/044,700

(22) Filed: Oct. 2, 2013

(65) Prior Publication Data

US 2015/0028541 A1    Jan. 29, 2015

(30) Foreign Application Priority Data

Jul. 26, 2013   (JP) .................................. 2013-155471

(51) Int. Cl.
  *A63F 9/24*   (2006.01)
  *A63F 7/32*   (2006.01)
  *G07F 17/32*  (2006.01)

(52) U.S. Cl.
  CPC .............. *A63F 7/32* (2013.01); *G07F 17/3297* (2013.01)

(58) Field of Classification Search
  USPC ............................................................ 463/3
  IPC ....................................................... A63F 13/10
  See application file for complete search history.

(56) References Cited

U.S. PATENT DOCUMENTS

| | | | | |
|---|---|---|---|---|
| 5,700,193 | A  * | 12/1997 | d'Achard Van Enschut | 463/3 |
| 6,347,999 | B1 * | 2/2002  | Yuan | 463/46 |
| 2005/0208993 | A1 | 9/2005 | Yoshizawa et al. | 463/20 |
| 2008/0146301 | A1 | 6/2008 | Goggin et al. | 463/1 |

FOREIGN PATENT DOCUMENTS

| | | |
|---|---|---|
| JP | 2004-016716 | 1/2004 |
| JP | 2005-258808 | 9/2005 |
| JP | 2008/149145 | 7/2008 |
| JP | 2009-106728 | 5/2009 |

OTHER PUBLICATIONS

Japanese Office Action issued on Oct. 29, 2013 in connection with Japanese Patent Application No. 20 13-155471.
Weekly Famitsu, Japan, Enterbrain, Inc., Jul. 31, 2009, vol. 24, No. 32, pp. 28-31.

* cited by examiner

*Primary Examiner* — Omkar Deodhar
(74) *Attorney, Agent, or Firm* — Pillsbury Winthrop Shaw Pittman LLP (57) ABSTRACT

One object of a game program according to an embodiment is to provide a pinball game requiring more strategies. The game program comprises: a stage selection module for receiving stage selection by the user; a ball selection module for receiving selection of one or more ball objects by the user from a plurality of ball objects each having parameters; a screen display module for displaying a game screen; an owned point updating module for updating the owned point information such that the points are consumed in accordance with the game play; an injection module for injecting the ball objects; a ball-hitting operation module for operating flippers in accordance with instructions from the user; a game progress module for progressing the pinball game based at least on the parameters assigned to the selected ball objects; and a level updating module for updating the level of the ball objects.

9 Claims, 10 Drawing Sheets

User Information Management Table

| User ID |
| --- |
| Owned Points |
| Cleared Stage Information |
| ... |

Fig. 3

Ball Information Management Table

| User ID |
| --- |
| Ball ID |
| Level |
| Number of Obtained Items |
| Usability Flag |
| Skill |
| Offense Power |
| Team |
| ... |

PROGRAM, SERVER, AND METHOD FOR PINBALL GAME

CROSS-REFERENCE TO RELATED APPLICATIONS

This application is based on and claims the benefit of priority from Japanese Patent Application Serial No. 2013-155471 (filed on Jul. 26, 2013), the contents of which are hereby incorporated by reference in their entirety.

TECHNICAL FIELD

The present invention relates to a program, server, and method for a pinball game, and in particular, to a program for causing one or more computers to serve as a system for providing a pinball game to a user, and a server and method for providing a pinball game to a user operating a terminal device communicatively connected.

BACKGROUND

Conventionally known pinball games provided by the above kind of program include video games simulating real pinball (see, e.g., Japanese Patent Application Publication No. 2008-149145). In such pinball games, for example, a user operates flippers to hit a ball and earns a score when the ball strikes the target, in accordance with real pinball rules.

SUMMARY

However, such video pinball games simulating unmodified real pinball does not sufficiently provide a user with playability specific to video games. In addition, after the user has become familiar with operations of the pinball games, the user cannot further enjoy the game because of poor strategic elements.

One object of the embodiments of the present invention is to provide a pinball game requiring more strategies. Other objects of the present invention will be apparent with reference to the entire description in this specification.

A program according to an embodiment of the present invention is a program for causing one or more computers to serve as a system for providing a pinball game to a user, the program comprising: a ball selection module configured to receive selection of one or more ball objects by the user from a plurality of ball objects each having a parameter; a screen display module configured to display a game screen containing a game field of the pinball game; an injection module configured to inject the selected ball objects into the game field; a ball-hitting operation module configured to operate a ball-hitting object arranged in the game field in accordance with an instruction from the user; and a game progress module configured to move the injected ball objects at least in accordance with the operation of the ball-hitting object and progressing the pinball game based at least on the parameter assigned to the selected ball objects.

A server according to an embodiment of the present invention is a server for providing a pinball game to a user operating a terminal device communicatively connected to the server, the server comprising: a ball selection unit configured to receive, via the terminal device, selection of one or more ball objects by the user from a plurality of ball objects each having a parameter; a screen display unit configured to display on the terminal device a game screen containing a game field of the pinball game; an injection unit configured to inject the selected ball objects into the game field; a ball-hitting operation unit configured to operate a ball-hitting object arranged in the game field in accordance with an instruction from the user operating the terminal device; and a game progress unit configured to move the injected ball objects at least in accordance with the operation of the ball-hitting object and progressing the pinball game based at least on the parameter assigned to the selected ball objects.

A method according to an embodiment of the present invention is a method using a system for providing a pinball game to a user, the method comprising the steps of: receiving selection of one or more ball objects by the user from a plurality of ball objects each having a parameter; displaying a game screen containing a game field of the pinball game; injecting the selected ball objects into the game field; operating a ball-hitting object arranged in the game field in accordance with an instruction from the user; and moving the injected ball objects at least in accordance with the operation of the ball-hitting object and progressing the pinball game based at least on the parameter assigned to the selected ball objects.

ADVANTAGES

Various embodiments of the present invention provide a pinball game requiring more strategies.

DESCRIPTION OF EXAMPLE EMBODIMENTS

Figure 1:
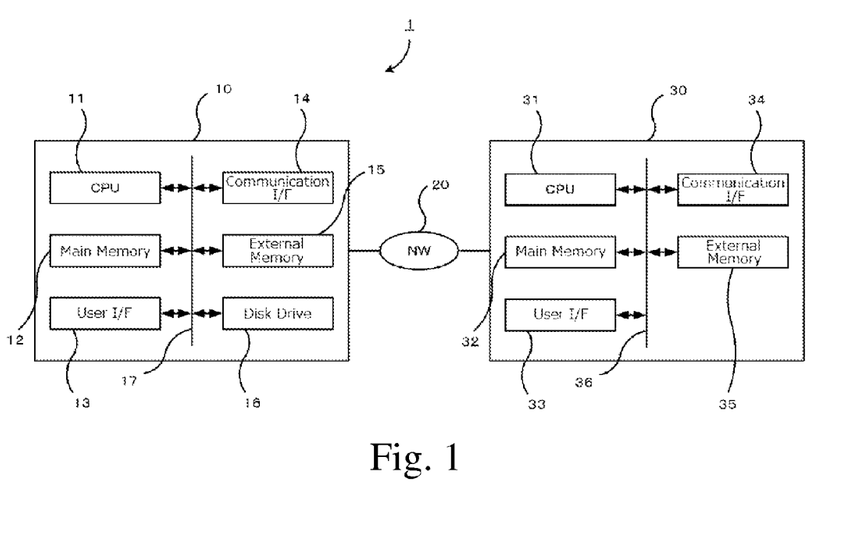
FIG. 1 is a block diagram schematically illustrating a network configuration of a system 1 according to an embodiment of the present invention.

FIG. 1 is a block diagram schematically illustrating a network configuration of a system 1 according to an embodiment of the present invention. As shown, the system 1 according to the embodiment may comprise a server 10 configured as a common computer and a terminal device 30 communicatively connected to the server 10 via a communication network 20 such as the Internet and configured as a common computer; and the system 1 may provide users operating the terminal device 30 with various games including pinball games. Additionally, the server 10 may be communicatively connected to terminal devices other than the terminal device 30 and not shown. The system 1 may provide various digital contents other than games to the user operating the terminal device 30, provide various Internet services other than provision of digital contents, and provide a platform that implements various communications between a plurality of users operating a plurality of terminal devices 30.

As shown, the server 10 may include a central processing unit (CPU) (processor) 11, a main memory 12, a user interface (I/F) 13, a communication I/F 14, an external memory 15, and a disk drive 16, and these components may be electrically connected to one another via a bus 17. The CPU 11 may load an operating system and various programs such as control programs for controlling the progress of an online game into the main memory 12 from the external memory 15, and may execute commands included in the loaded programs. The main memory 12 may be used to store a program to be executed by the CPU 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminal devices 30 via the communication network 20.

The external memory 15 may be formed of, for example, a magnetic disk drive and store various programs such as a control program for controlling the progress of an online game. The external memory 15 may also store various data used in the game. The various data that may be stored in the external memory 15 may also be stored on a database server communicatively connected to the server 10 and physically separate from the server 10. The disk drive 16 may read data stored in a storage medium such as a compact disc read only memory (CD-ROM), digital versatile disc read only memory (DVD-ROM), or DVD Recordable (DVD-R) disc, or write data to such a storage medium. For example, a game application and data such as game data stored in a storage medium may be read by the disk drive 16, and may be installed into the external memory 15.

In an embodiment, the server 10 may be a web server for managing a web site including a plurality of hierarchical web pages and may be capable of providing the terminal devices 30 with game services. The terminal devices 30 may fetch HTML data for rendering a web page from the server 10 and analyze the HTML data to present the web page to a user (a user of the game) of the terminal devices 30. A game provided through such a web page is sometimes called a browser game. The HTML data for rendering the web page may also be stored on the external memory 15. The HTML data may comprise HTML documents written in markup languages such as HTML; the HTML documents may be associated with various images. Additionally, the HTML documents may include programs written in script languages such as ActionScript™ and JavaScript™.

The external memory 15 may store game applications to be executed on execution environments of the terminal device 30 other than browser software. This game application may include game programs for performing a game and various data such as image data to be referred to for executing the game programs. The game programs may be created in, for example, object oriented languages such as Objective-C™ and Java™. The created game programs may be stored on the external memory 15 in the form of application software along with various data. The application software stored on the external memory 15 may be delivered to a terminal device 30 in response to a delivery request. The application software delivered from the server 10 may be received by the terminal device 30 through a communication I/F 34 in accordance with the control of CPU 31; the received game programs may be sent to an external memory 35 and stored thereon. The application software may be launched in accordance with the user's operation on the terminal device 30 and may be executed on a platform implemented on the terminal device 30 such as NgCore™ or Android™. The server 10 may provide the game applications executed on the terminal devices 30 with various data required for progression of the games. Additionally, the server 10 can store various data sent from the terminal device 30 for each user, thereby managing the progression of the game for each user.

Thus, the server 10 may manage the web site for providing game services and deliver web pages constituting the web site in response to a request from the terminal device 30, thereby progressing the game. Also, the server 10 can progress a game by communicating with a game application performed on the terminal device 30 in place of, or in addition to, such a browser game. Whichever mode may be taken to provide the game, the server 10 can store data required to progress the game for each identification identifying a user. Briefly, the server 10 may also include a function to authenticate a user at start of the game and perform charging process in accordance with progression of the game. The games provided by the server 10 may include desired games such as action games, role playing games, interactive baseball games, and card games. The types of the games implemented by the web site or game applications of the server 10 are not limited to those explicitly described herein.

In an embodiment, the terminal device 30 may be any information processing device that may display on a web browser a web page of a game web site obtained from the server 10 and include an application executing environment for executing game applications; and the terminal devices 30 may include smartphones, tablet terminals, and game-dedicated terminals.

As shown, the terminal device 30 may include a central processing unit (CPU) (processor) 31, a main memory 32, a user interface (I/F) 33, a communication I/F 34, and an external memory 35, and these components may be electrically connected to one another via a bus 36.

The CPU 31 may load various programs such as an operating system into the main memory 32 from the external memory 35, and may execute commands included in the loaded programs. The main memory 32 may be used to store a program to be executed by the CPU 31, and may be formed of, for example, a dynamic random access memory (DRAM).

The user I/F 33 may include an information input device for receiving user inputs and an information output device for outputting an operation result of CPU 31; and the user I/F may include a display device such as a liquid crystal display having a touch panel.

The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server 10 via the communication network 20.

The external memory 35 may comprise, for example, a magnetic disk drive or a flash memory and store various programs such as an operating system. When receiving a game application from the server 10 via the communication I/F 34, the external memory 35 may store the received game application.

A terminal device 30 having such an architecture may include, for example, browser software for interpreting an HTML file (HTML data) and rendering a screen; this browser software may enable the terminal device 30 to interpret the HTML data fetched from the server 10 and render web pages corresponding to the received HTML data. Further, the terminal device 30 may include plug-in software (e.g., Flash Player distributed by Adobe Systems Incorporated) embedded into browser software; therefore, the terminal device 30 can fetch from the server 10 a SWF file embedded in HTML data and execute the SWF file by using the browser software and the plug-in software.

When a game is executed on the terminal device 30, for example, animation or an operation icon designated by the program may be displayed on a screen of the terminal device 30. The user may enter an instruction for progressing the game using an input interface of the terminal device 30. The instruction entered by the user may be transmitted to the server 10 through the browser of the terminal device 30 or a platform function such as NgCore™.

Figure 2:
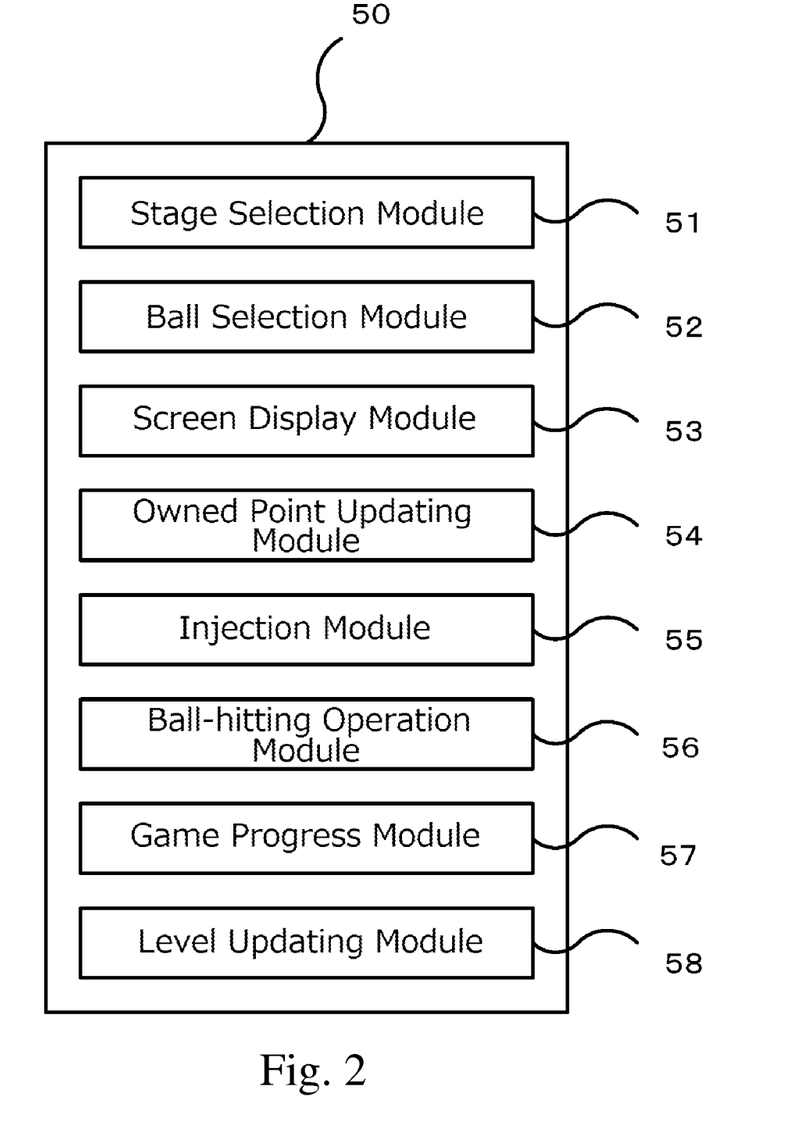
FIG. 2 is a block diagram schematically illustrating the module arrangement of a game program 50 according to an embodiment of the present invention.

Next, a game program 50 according to an embodiment will be described; the game program 50 may cause the system 1 to serve as a system for providing a user with a pinball game. FIG. 2 is a block diagram illustrating the module arrangement of a game program 50 according to an embodiment. As shown, the game program 50 may comprise: a stage selection module 51 for receiving stage selection by the user from a plurality of stages having different types of game fields of the pinball game; a ball selection module 52 for receiving selection of one or more ball objects by the user from a plurality of ball objects each having parameters assigned thereto; a screen display module 53 for displaying a game screen containing a game field corresponding to the selected stage; an owned point updating module 54 for determining the points (value information) to be consumed in accordance with the pinball game play based on the ball objects selected by the user and updating the owned point information such that the determined points are consumed; an injection module 55 for injecting the selected ball objects into the game field; a ball-hitting operation module 56 for operating flippers (ball-hitting objects) arranged in the game field in accordance with instructions from the user; a game progress module 57 for moving the injected ball objects at least in accordance with the operation of the flippers and progressing the pinball game based at least on the parameters assigned to the selected ball objects; and a level updating module 58 for updating the level of the ball objects satisfying a predetermined level-up condition. The game program 50 according to the embodiment may be stored, for example, on the external memory 15 of the server 10; and all or part of the modules constituting the game program 50 may be sent to the terminal device 30 so as to be executed on the web browser or as a game application; thus, the game program 50 may be performed by the CPU 11 of the server 10 or the CPU 31 of the terminal device 30.

Figure 3:
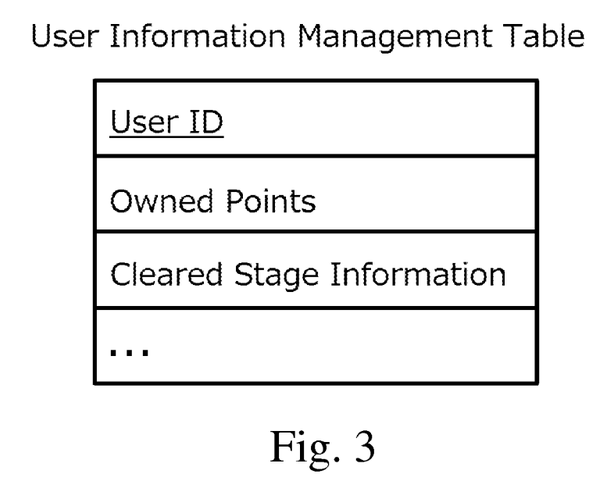
FIG. 3 is a diagram showing an example of a user information management table according to an embodiment.
Figure 4:
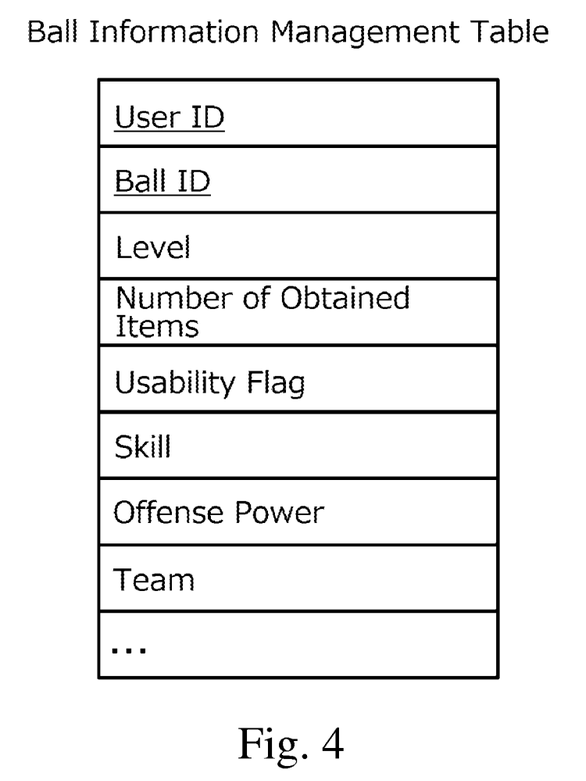
FIG. 4 is a diagram showing an example of a ball information management table according to an embodiment.

FIGS. 3 and 4 show examples of the user information management table and the ball information management table stored on, for example, the external memory 15 of the server 10 that serves as an information storage unit for storing information on the system 1. As shown in FIG. 3, the user information management table according to an embodiment may manage information such as "owned points" indicating the number of points owned by the user and "cleared stage information" indicating information on the stages of the pinball game cleared by the user, in association with "a user ID" identifying the user. In an embodiment, the points managed as "owned points" are used in the pinball game. These points may also be used in games other than the pinball game, as well as in services other than games or on other platforms provided by the system 1.

As shown in FIG. 4, the ball information management table according to an embodiment may manage information such as "level" indicating the current level of a ball object of a user, "number of obtained items" indicating the number of level-up items obtained by the ball object of the user, "usability flag" indicating whether the user can use this ball object, "skill" indicating the skill (event specifying parameter) assigned to the ball object, "offense power" indicating the offense power assigned to the ball object, and "team" indicating the team including the ball object, in association with a combination of "a user ID" identifying the user and "a ball ID" identifying the ball object. The "skill" assigned to the ball object may be a parameter specifying a predetermined event occurring in accordance with an instruction from the user, and will be described in detail later. The "offense power" may be a parameter indicating the power of destroying a target object exerted by the ball object striking the target object in the game field.

Figure 5:
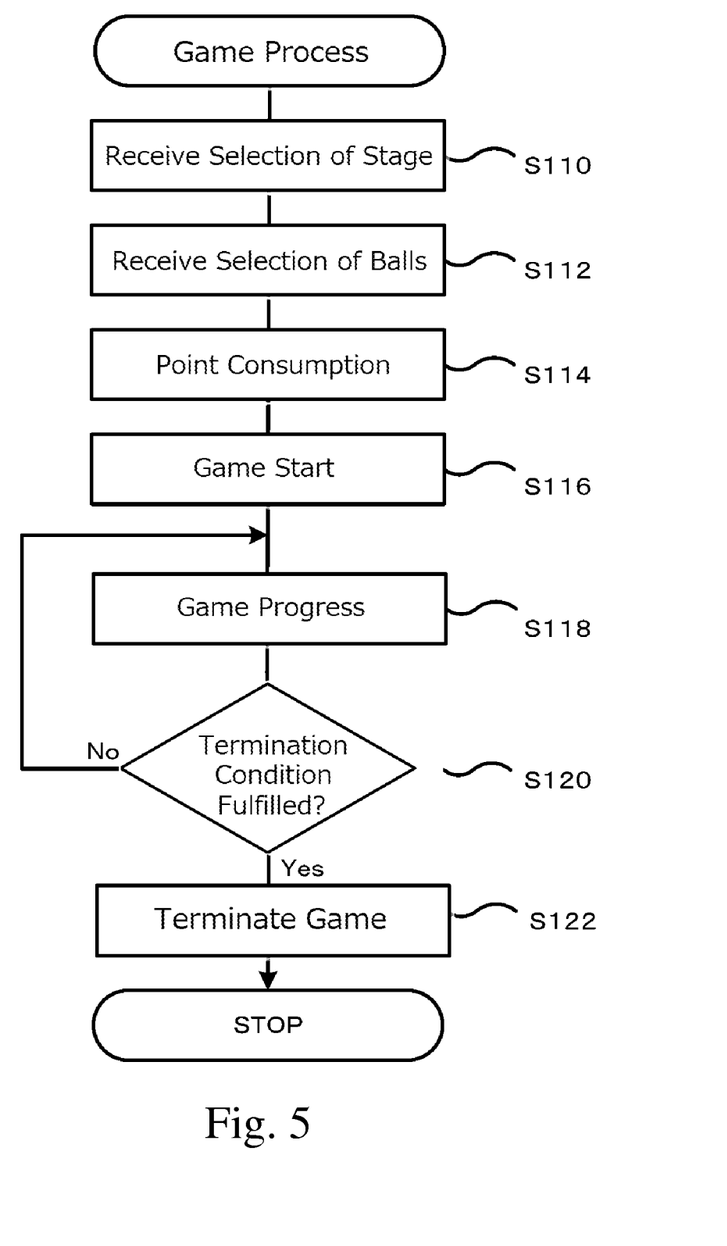
FIG. 5 is a flow diagram showing an example of a game process according to an embodiment.

In the pinball game provided by the system 1 according to an embodiment, a user playing the game for the first time can use only a part of the plurality of ball objects; and as the user repeatedly plays the game, the user can use more of the remaining ball objects. For example, a particular ball object may become usable when the user clears a particular stage; a particular ball object may become usable when the user earns a score equal to or greater than a predetermined value; a particular ball object may become usable when the user plays the game for a predetermined number of times or more; and a particular ball object may become usable when the user buys with a particular virtual currency (or with points managed by the above user information management table). Thus, when the usability of a ball object is changed, the value of the "usability flag" in the ball information management table may be updated. The usability of a ball object may also be managed in units of teams because users may select ball objects in units of teams, as will be described later, Next, the operation of the system 1 thus configured will now be described. FIG. 5 is a flow diagram showing an example of a game process performed by the system 1. This game process may be performed when a user operating the terminal device 30 sends to the server 10 a display request for a web page for playing the pinball game or when a game application for the pinball game is launched on the terminal device 30.

Figure 6:
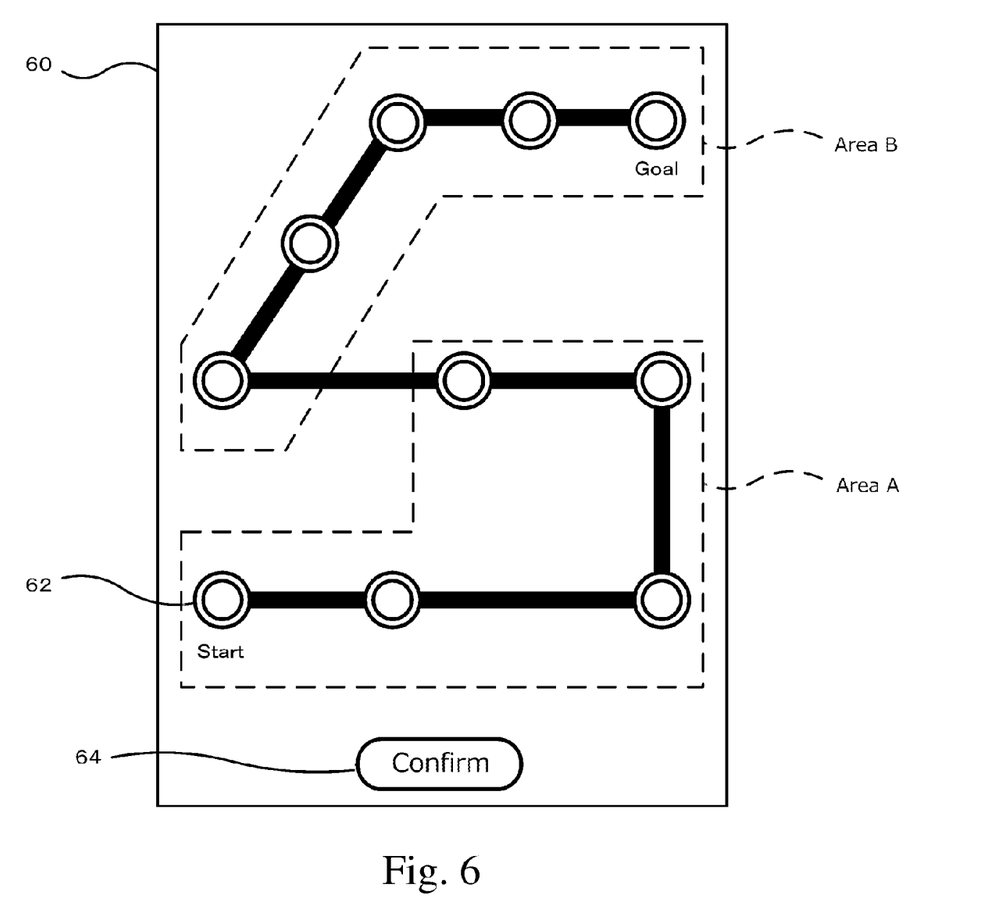
FIG. 6 is a diagram showing an example of stage selection screen 60 according to an embodiment.

As shown, the first step of the game process may be to receive stage selection by the user (step S110). More specifically, a stage selection screen 60 where the user selects a stage may be displayed on the terminal device 30, and stage selection by the user may be received via the stage selection screen 60. FIG. 6 shows an example of stage selection screen 60 according to an embodiment. As shown, the stage selection screen 60 according to an embodiment may contain a map including a plurality of stage points 62, each corresponding to a stage, arranged in a route in the order to be cleared; the user operating the terminal device 30 may select a desired stage point 62 and select the Confirm button 64, thereby to select the stage to be played. In the embodiment shown, five stage points 62 from the first stage point with a caption "Start" constitute an area A; and the following five stage points 62 to the last stage point 62 with a caption "Goal" constitute an area B. In an embodiment, there may be uniformity between stages constituting a same area in game field exterior (e.g., color tones and displayed characters) and the types of target objects arranged in the game field. Further, in an embodiment, the user may start with the first stage with a caption "Start" and clear the stages in the arranged order, thereby selecting the subsequent stages in the arranged order. The stage points 62 currently unselectable to the user may be displayed in a different manner (e.g., grayed out or hidden) than the selectable stage points 62. In addition, the area B subsequent to the area A may be displayed in a different manner (e.g., grayed out or hidden) than the area A until all the stages constituting the area A are cleared. Also, when the user selects a stage point 62, information on the corresponding stage may be displayed (e.g., information on conditions for clearing the stage or target objects arranged in the game field).

Figure 7:
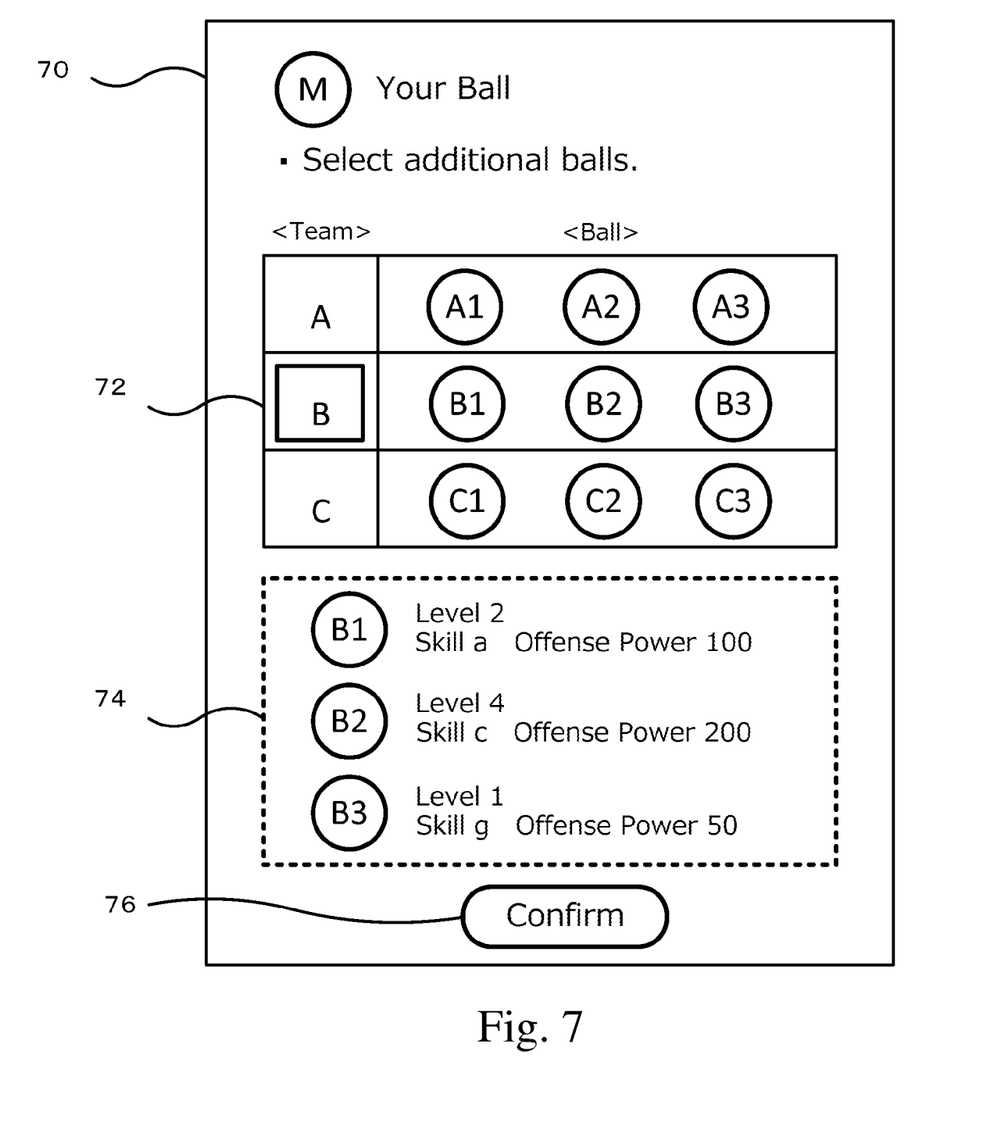
FIG. 7 is a diagram showing an example of ball selection screen 70 according to an embodiment.

The step after receiving the stage selection by the user is to receive the ball object selection by the user (step S112). More specifically, a ball selection screen 70 where the user selects a ball object may be displayed on the terminal device 30, and ball object selection by the user may be received via the ball selection screen 70. FIG. 7 shows an example of ball selection screen 70 according to an embodiment. As shown, a ball selection screen 70 according to an embodiment may include a ball selection area 72 where the user selects ball objects to be added, a ball information display area 74 for displaying information on the ball object selected in the ball selection area 72, and a Confirm button 76 with which the user confirms the ball object selection. As shown, the ball selection area 72 may contain ball objects usable to the user in the form of teams constituted by a plurality (e.g., three in FIG. 7) of ball objects; and the user may select a desired team from a plurality of teams displayed, thereby selecting the ball objects constituting the team. The ball objects usable to the user may be specified by referring to the "usability flag" in the above-mentioned ball information management table. In an embodiment, a plurality of ball objects may correspond to a plurality of characters, thereby producing a story line in the pinball game wherein the plurality of characters clear the above stages. As part of the story line, a ball object corresponding to the protagonist character may be preset as the ball object for the user, and the user may select, via the ball selection screen 70, ball objects corresponding to the characters to accompany the protagonist character. Further, for example, a team may be constituted by ball objects corresponding to characters of the same type or characters related to each other, and may be constituted by ball objects having assigned thereto "skills" of the same type or "skills" related to each other. Thus, the user can enjoy the story line in the pinball game through the selection of the ball objects corresponding to the characters. In an embodiment, the user may only select a team thereby to readily select ball objects. The methods of selecting ball objects are not particularly limited and may be various apart from the above method. For example, all the ball objects may be selected without presetting the ball object for the user. It may also be possible that usable ball objects may be individually displayed without being included in a team, and the user may select desired ball objects individually from the ball objects displayed. Further, one ball object, not a plurality of ball objects, may also be selected.

As shown in FIG. 7, the ball information display area 74 of the ball selection screen 70 may display information such as the current level, the skills, and the offense power of the ball objects selected by the user in the ball selection area 72 (that is, ball objects constituting the selected team). These information items may be managed by the ball information management table. The user may select ball objects with reference to the information displayed in the ball information display area 74.

The step after thus receiving the ball object selection by the user may be to determine the points necessary for playing the pinball game based on the selected ball objects, such that the points may be consumed by the player (step S114). More specifically, the determined points may be subtracted from the "owned points" in the user information management table. The points necessary for playing the pinball game may be determined by, for example, previously assigning the necessary points to each ball object and summarizing the necessary points assigned to the selected ball objects. Alternatively, it may also be possible to previously assign the necessary points to each team and use the necessary points assigned to the selected team. For example, a ball object that permits the user to progress the pinball game more advantageously (e.g., a ball object of a high level or a ball object having a large offense power) may have assigned thereto a larger necessary points. Thus, the variation of necessary points in accordance with the selected ball object (or team) may produce more strategic elements in selection of ball objects by the user. Additionally, the necessary points may also be determined based on the selected stage, in addition to the selected ball objects.

Figure 8:
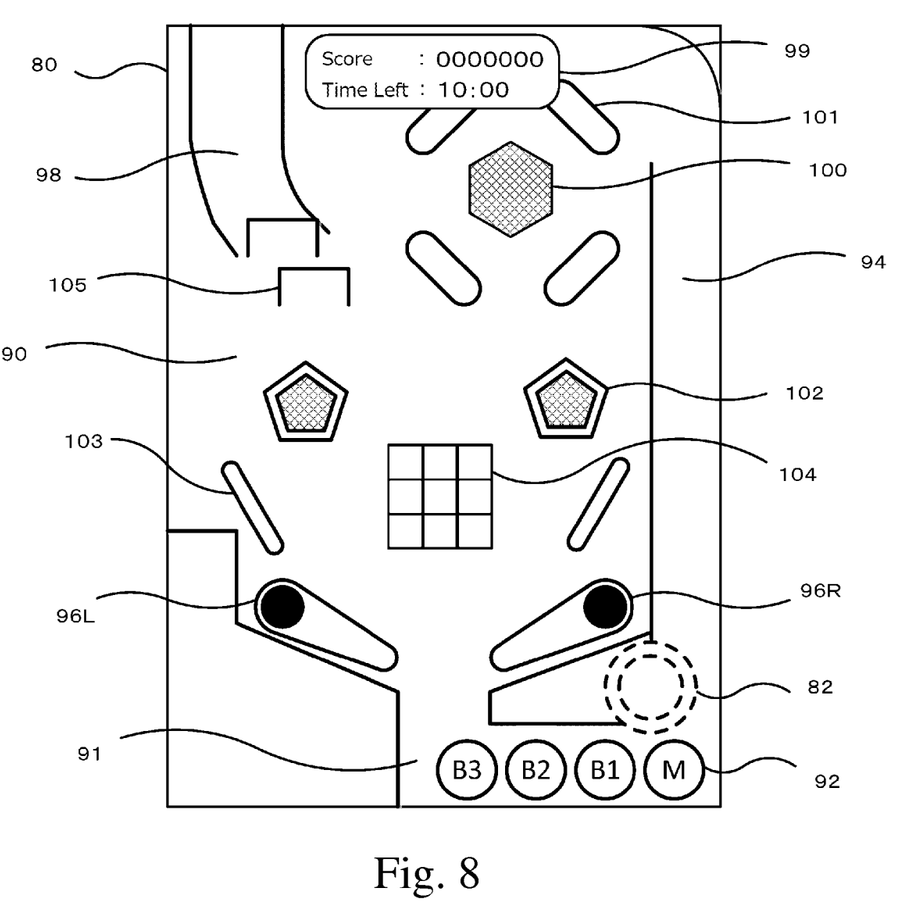
FIG. 8 is a diagram showing an example of game screen 80 according to an embodiment.

The step after thus consuming necessary points may be to start the pinball game (S116) and progress the game until the termination condition of the game is fulfilled (steps S118 and S120). More specifically, the process of starting the pinball game may include display of a game screen 80 on the terminal device 30, the game screen 80 containing a game field corresponding to the stage selected by the user in step S110. FIG. 8 shows an example of game screen 80 according to an embodiment. As shown, the game screen 80 according to the embodiment may correspond to the board of the pinball game where various target objects 100 to 105 and other objects are arranged in the game field 90. The ball objects 92 selected by the user in step S112 may be placed in an injection standby area 91 at the lower right corner of the screen; and the ball objects 92 placed in the injection standby area 91 may be injected into the game field 90 through an injection path 94 when the user touches an injection button 82 also arranged in the lower right corner of the screen. The game field 90 may contain, in the lower portion, a pair of flippers 96L, 96R; and when, e.g., the user touches the area where the flippers 96L, 96R are displayed or the area within a predetermined range from this area, these flippers may operate to hit the ball objects 92 falling down from the upper portion of the screen. In an embodiment, the ball objects 92 having fallen between the flippers 96L and 96R may be placed in the injection standby area 91 again and injected into the game field 90 again when, e.g., the user touches the injection button 82. In an embodiment, the ball objects 92 having fallen between the flippers 96L and 96R can be injected into the game field 90 for any desired number of times within the time limit of the game. In addition, the game field 90 shown in this example may contain an EX field path 98 leading to an extra field that is an additional game field; and when one of the ball objects 92 passes through the Ex field path 98, the display of the game screen 80 may be switched to the extra field. In an embodiment, the extra field may contain more target objects and level-up items than regular game fields 90; thus, the user can earn a larger score and more items in the extra field. Further, the game screen 80 may contain, at the top, an information display area 99 for displaying the user's current score and the remaining time of the game.

In such game screen 80, the user may operate the flippers 96L, 96R to hit the ball objects 92, and when the hit ball objects 92 strike the target objects arranged in the game field 90, the user may earn a score (reward) that is added to the user's score displayed in the information display area 99. The target objects arranged in the game field 90 may be various. For example, a target object may be destroyed when struck by the ball objects 92 for a predetermined number of times. In this case, when the target object is destroyed, the user may be provided with a larger score than in ordinary cases; or the above-mentioned predetermined number of times may be changed depending on the a parameter (e.g., offense power) of the ball objects 92 (e.g., ball objects 92 having a larger offense power can destroy a target object in a smaller number of times). Further, it may also be possible that a destroyed target object should turn into an item that can be obtained when struck by a ball object 92. Also, a target object may be passed by the ball objects 92, such that the user may earn a score (e.g., a target object 105 shown in FIG. 8). Further, another target object may have a grid that may display pictures in the squares for a lottery when passed by a ball object 92; the user may be provided with a larger score than in ordinary cases if, as a result of the lottery, the same pictures are placed straightly (e.g., a target object 104 shown in FIG. 8).

Figure 9:
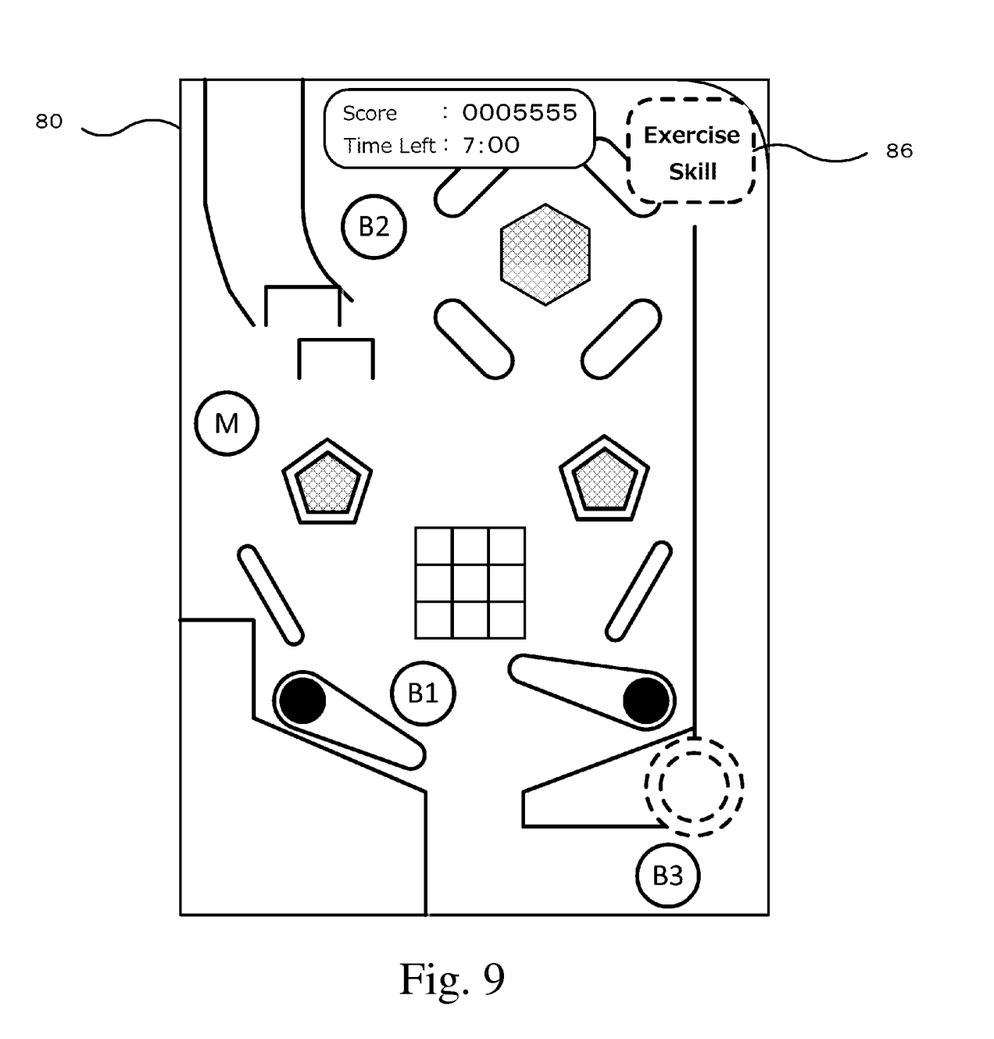
FIG. 9 is a diagram showing another display mode of game screen 80 according to an embodiment.

The description will now be made on the operation of producing a predetermined event specified by the skill assigned to the ball objects 92. In an embodiment, when a predetermined skill exercising condition is satisfied, a predetermined event may be produced in accordance with the skill of the ball objects 92 and, as shown in the example in FIG. 9, a skill exercising button 86 may be displayed in the upper right corner of the screen. The predetermined skill exercising condition may be, for example, that the score of the user is equal to or greater than a predetermined value, that a particular target object is destroyed, or that a particular item is obtained. Further, a plurality of stages may be provided in the predetermined skill exercising conditions; and in accordance with the satisfied stage of the skill exercising conditions, the number of the ball objects 92 that produce the predetermined event may be increased (e.g., as the user earns a larger score or destroys a larger number of particular target objects, the user can produce predetermined events in accordance with the skills of a larger number of ball objects 92).

Figure 10:
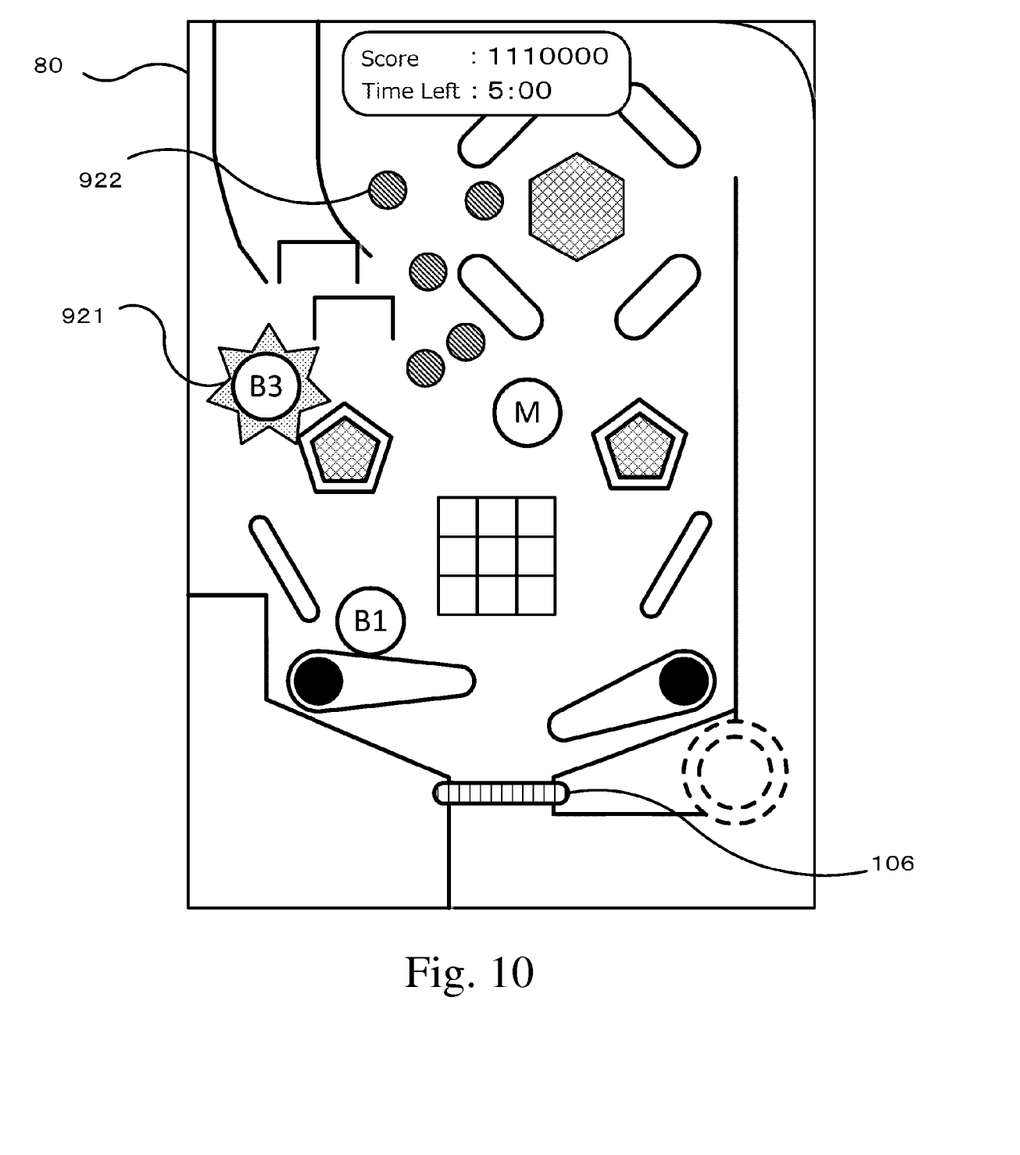
FIG. 10 is a diagram showing still another display mode of game screen 80 according to an embodiment.

FIG. 10 shows an example of the game screen 80 where the user has touched the skill exercising button 86 to produce a predetermined event. The predetermined events in accordance with the skills of the ball objects 92 may be various. For example, a predetermined event may change the characteristics of the ball objects 92. More specifically, a predetermined event may provide the ball objects 92 with an attribute (e.g., flame, ice, or thunder) (the ball object 921 shown in FIG. 10). In this case, a target object may have an attribute previously assigned thereto; and the operation of the ball object 92 striking a target object may be controlled based on the attribute provided to the ball object 92 and the attribute of the target object. For example, when the combination of the attribute provided to the ball object 92 and the attribute of the target object struck by the ball object 92 corresponds to a predetermined combination (e.g., the attribute of the ball object 92 and the attribute of the target object are "flame" and "tree," or "thunder" and "iron," respectively), the user can earn a higher score than in ordinary cases, or the user can destroy the target object in a smaller number of times than in ordinary cases. Another predetermined event may increase the number of the ball objects 92. In this case, there may be staged display as if a ball object 92 is divided into small ball objects (the ball objects 922 shown in the example in FIG. 10). Still another predetermined event may change other characteristics of the ball object 92 such as the size or offense power. Yet another predetermined event may have an effect other than changing the characteristics of the ball object 92. For example, the predetermined event may provide an object that restricts the ball object 92 from falling between the flippers 96L and 96R (the object 106 shown in the example in FIG. 10). Thus, the user can produce a predetermined event in accordance with the skill assigned to the selected ball object 92 thereby to advantageously progress the pinball game. The produced event may be terminated when a predetermined termination condition is satisfied (e.g., when a predetermined time period elapses or a target object is struck for a predetermined number of times). Additionally, the ball object 92 whose skill is to be exercised (the ball object 92 having assigned thereto the skill of producing a predetermined event) may be either designated by the user or selected randomly.

Figure 11:
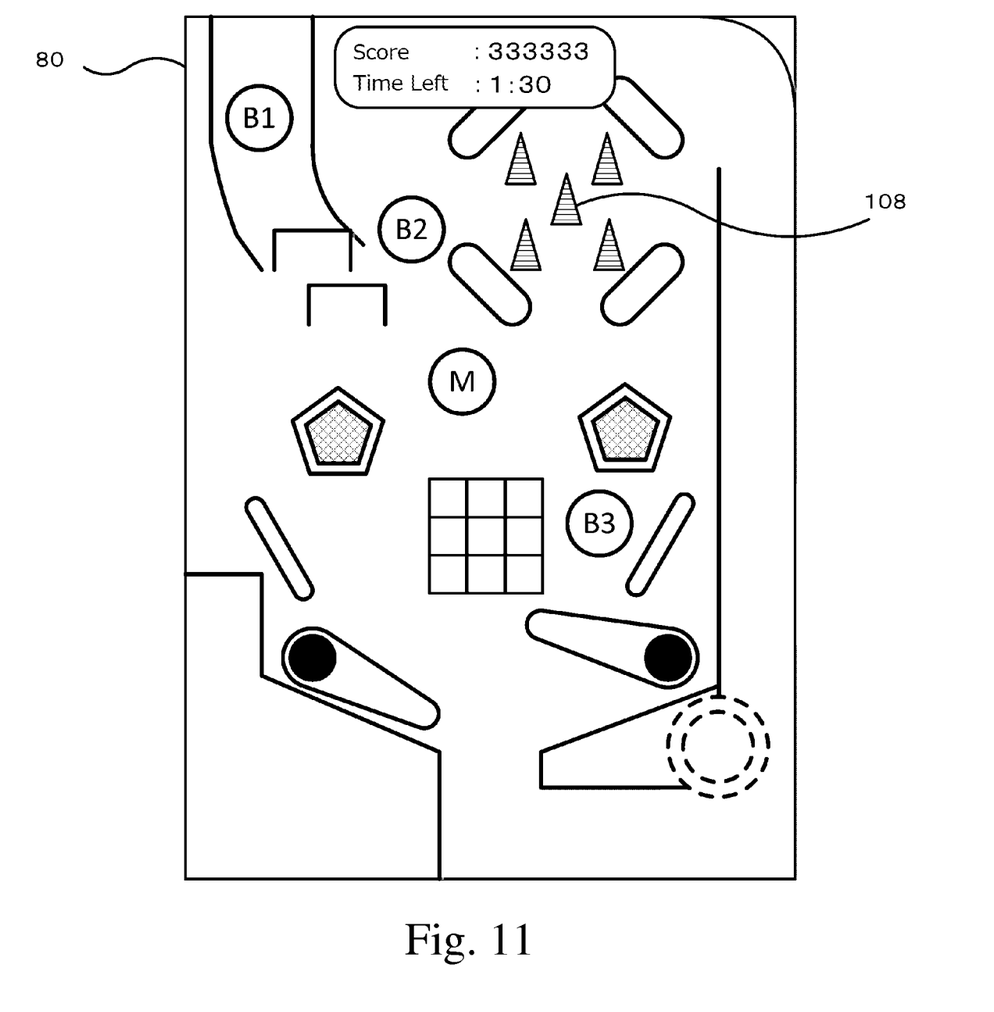
FIG. 11 is a diagram showing yet another display mode of game screen 80 according to an embodiment.

Next, the operation of raising the level of ball objects 92 in accordance with an embodiment will now be described. The predetermined level-up conditions under which the level of the ball objects 92 are raised may be various. In an embodiment, a predetermined level-up condition may be that the ball object 92 obtains a predetermined number of level-up items (i.e., that the ball object strikes a first type of target objects for a predetermined number of times). FIG. 11 shows an example of the game screen 80 where level-up items 108 have appeared. In an embodiment, when a particular target object (e.g., the target object 100 shown in FIG. 8) is destroyed, a level-up item 108 may appear. Further, when a ball object 92 strikes the item 108, the ball object 92 may obtain the item 108; the item 108 may disappear from the game field 90 and "the number of obtained items" in the ball information management table may be updated. Further, when "the number of obtained items" reaches a predetermined number, the level of the ball object 92 may be raised, and the "level" in the ball information management table may be updated. The pinball game may progress more advantageously to the user as the ball object 92 has a higher level. For example, as the ball object 92 has a higher level, the offense value may be higher, or the content of a predetermined event produced in accordance with the skill may be reinforced (e.g., the duration of the event may be prolonged). In another embodiment, "number of obtained items" may be managed for each user in the user information management table and, when the user obtains the item 108 in the game field 90, "number of obtained items" in the user information management table may be updated; and a predetermined number of items among the obtained items may be used to raise the level of the ball object 92 desirably selected by the user.

Referring back to the game process shown in FIG. 5, after the game is thus progressed and the termination condition of the game is satisfied, the process of terminating the pinball game may be performed (step S122) to terminate the game process. The termination condition of the game may be, for example, that the remaining time is zero or that a clearing condition of the stage is fulfilled. In the process of terminating the pinball game, the terminal device 30 may display, for example, a screen in accordance with whether the clearing condition of the stage has been fulfilled. The clearing condition of the stage may be various, the examples of which may be obtaining a score higher than a predetermined value, destroying a larger number of target objects than a predetermined number, and obtaining a larger number of items than a predetermined number.

As described above, the system 1 according to an embodiment of the present invention may progress the pinball game based on the parameters assigned to the one or more ball objects; the ball objects are selected by the user from a plurality of ball objects each having parameters assigned thereto (such as level, skill and offense power). Accordingly, the user may find strategic elements in selecting the ball objects. Additionally, the parameters assigned to the ball objects may include the level of the ball objects; and the pinball game may be progressed more advantageously to the user as the level is higher. Therefore, the user may be required to select the ball objects in terms of the level, and thus may find more strategic elements in selecting the ball objects, while enjoying raising the level of the ball objects.

In the system 1 according to an embodiment, the parameters assigned to the ball objects may include skill (event-specifying parameter), and a predetermined event may be produced in accordance with the skill. Therefore, the user may be required to select the ball objects in terms of the skill assigned to the ball objects, and thus may find more strategic elements in selecting the ball objects. Additionally, the operation of the ball objects striking a target object may be controlled based on the attribute provided to the ball object and the attribute of the target object. Therefore, the user may be required to select the ball objects in terms of the attribute of the target object arranged in the game field, and thus may find more strategic elements in selecting the ball objects. Further, the points consumed in accordance with the play of the pinball game may be determined depending on the selected ball object. Therefore, the user may find more strategic elements in selecting the ball objects.

In the system 1 according to an embodiment, the one example of the predetermined events in accordance with the skill may provide an attribute to the ball object 92; alternatively, the ball object may be provided with an attribute irrespective of whether an event is produced in accordance with the skill. That is, the operation of the ball object striking a target object may be controlled based on the attribute assigned to the ball object and the attribute assigned to the target object, irrespective of whether an event is produced in accordance with the skill.

The system 1 according to an embodiment may comprise a server 10 and a terminal device 30; alternatively, the system 1 may comprise a single computer such as a single smartphone, tablet terminal, or a game-dedicated terminal.

The processes and procedures described and illustrated herein may also be implemented by software, hardware, or any combination thereof other than those explicitly stated for the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

Even if the processes and the procedures described herein are executed by a single apparatus, software piece, component, or module, such processes and procedures may also be executed by a plurality of apparatuses, software pieces, components, and/or modules. Even if the data, tables, or databases described herein are stored in a single memory, such data, tables, or databases may also be dispersed and stored in a plurality of memories included in a single apparatus or in a plurality of memories dispersed and arranged in a plurality of apparatuses. The elements of the software and the hardware described herein can be integrated into fewer constituent elements or can be decomposed into more constituent elements.

With respect to the use of substantially any plural and/or singular terms herein, those having skill in the art can translate from the plural to the singular and/or from the singular to the plural as is appropriate to the context.

What is claimed is:

1. A non-transitory computer-readable storage medium storing a computer program, when executed, causing one or more computers to:
   receive selection of one or more ball objects by the user from a plurality of ball objects each having a parameter via a selection screen displaying the plurality of ball objects;
   display a game screen containing a game field of a pinball game;
   inject the selected ball objects into the game field;
   operate a ball-hitting object arranged in the game field in accordance with an instruction from the user; and
   move the injected ball objects at least in accordance with the operation of the ball-hitting object and progressing the pinball game based at least on the parameter assigned to the selected ball objects such that the progress of the pinball game is presented in the game screen; and
   wherein, after the ball objects having fallen outside the game field, the ball objects are injected into the game field again, and
   the parameter includes a level of the ball object, and the pinball game is progressed more advantageously to the user as the level of the ball object is higher.

2. The non-transitory computer-readable storage medium of claim 1, wherein the computer program further causes the one or more computers to update the level of the ball object fulfilling a predetermined level-up condition.

3. The non-transitory computer-readable storage medium of claim 2 wherein the predetermined level-up condition includes a condition related to a number of times when the ball objects strike a first type of target object arranged in the game field.

4. The non-transitory computer-readable storage medium of claim 1 wherein the parameter includes an attribute of the ball object, and wherein the computer program further causes the one or more computers to
   control operation of the ball object striking a target object arranged in the game field based on an attribute assigned to the target object and the attribute assigned to the ball object.

5. The non-transitory computer-readable storage medium of claim 1,
   wherein the one or more computers are capable of accessing an information storage unit configured to store at least owned value information indicating value information owned by the user; and, wherein the one or more computers are further caused by the computer program to
   determine the value information to be consumed in accordance with play of the pinball game based at least on the ball objects selected by the user and update the owned value information such that the determined value information is consumed.

6. The non-transitory computer-readable storage medium of claim 1 wherein the one or more computers are further caused by the computer program to provide a reward to the user at least when the moving ball objects strike a target object arranged in the game field.

7. The computer-readable storage medium of claim 1, wherein the program further comprises a stage selection module configured to receive selection of a stage by the user from a plurality of stages having different types of game fields, and
   wherein the screen display module displays the game screen containing a game field corresponding to the selected stage.

8. The non-transitory computer-readable storage medium of claim 7 wherein the stage has a predetermined clearing condition; and wherein the one or more computers are further caused by the computer program to:
- determine whether the predetermined clearing condition has been fulfilled, and
- receive selection of the stage by the user from the plurality of selectable stages determined based on the stages of which the predetermined clearing conditions are fulfilled by the user.

9. A method using one or more computers for providing a pinball game to a user, the method being implemented in a processor configured by machine-readable instructions, the method comprising:
- receiving selection of one or more ball objects by the user from a plurality of ball objects each having a parameter, the one or more ball objects being to be used in the pinball game;
- displaying a game screen containing a game field of the pinball game;
- injecting the selected ball objects into the game field;
- operating a ball-hitting object arranged in the game field in accordance with an instruction from the user;
- moving the injected ball objects at least in accordance with the operation of the ball-hitting object and progressing the pinball game based at least on the parameter assigned to the selected ball objects such that the progress of the pinball game is presented in the game screen; and
- injecting the ball objects having fallen outside the game field into the game field again; and
- wherein the parameter includes a level of the ball object, and the pinball game is progressed more advantageously to the user as the level of the ball object is higher.

* * * * *